March 21, 1961  P. RAPPAPORT ET AL  2,976,433
RADIOACTIVE BATTERY EMPLOYING SEMICONDUCTORS
Filed May 26, 1954
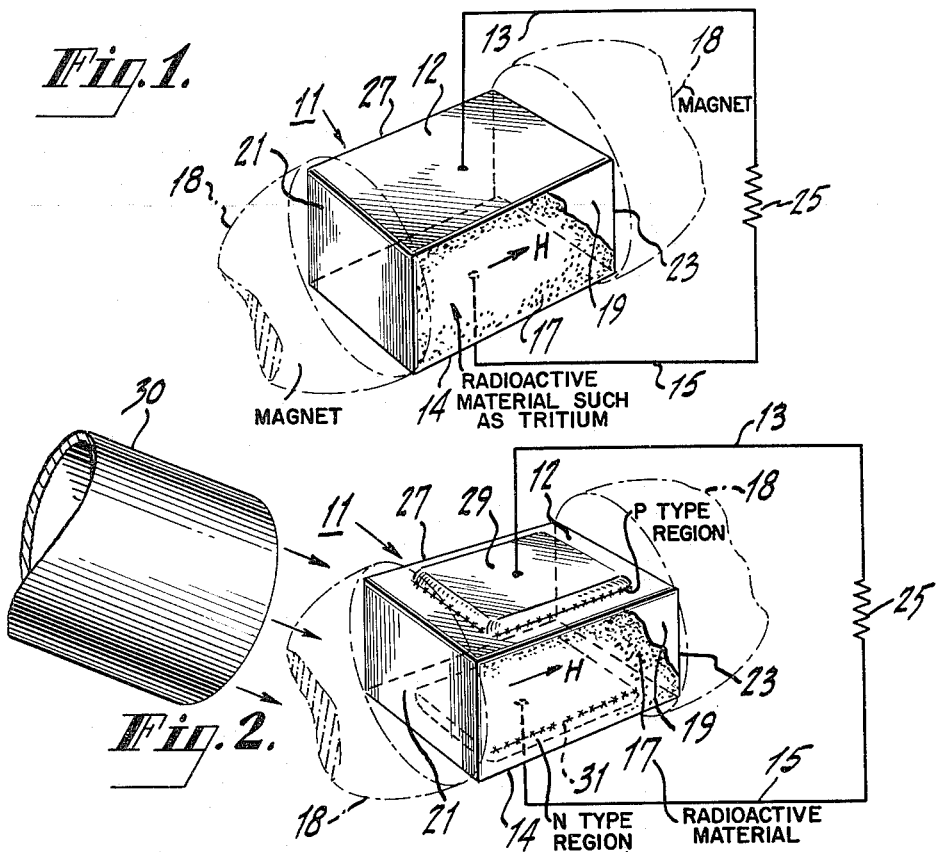
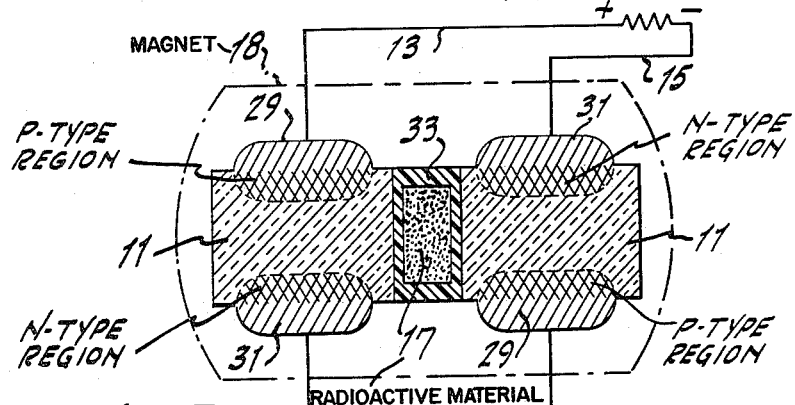
INVENTORS
PAUL RAPPAPORT &
JOSEPH J. LOFERSKI
BY [signature]
ATTORNEY 2,976,433
Patented Mar. 21, 1961

2,976,433

RADIOACTIVE BATTERY EMPLOYING SEMICONDUCTORS

Paul Rappaport, Princeton, and Joseph J. Loferski, Cranbury, N.J., assignors to Radio Corporation of America, a corporation of Delaware Filed May 26, 1954, Ser. No. 432,472

20 Claims. (Cl. 310—3)

This invention relates to methods of and means for converting the energy of nuclear radiations into useful electrical energy. Particularly the invention relates to irradiating a semi-conducting body or device with nuclear emissions and applying a magnetic field to the body to generate useful electrical power which is available at the output terminals of the device. The electric power thus provided may be utilized to supply current to a load circuit.

An object of the instant invention is to provide improved methods and means for utilizing the energy of nuclear emissions.

Another object of the invention is to provide improved methods and means for directly converting the energy of nuclear emissions into useful electrical energy.

Another object of the invention is to provide an improved primary source of electrical energy powered by the energy of nuclear radiations.

A further object of the invention is to provide an improved primary source of electrical power which employs radioactive isotopes.

A further object is to provide an improved radioactive or "atomic" battery which employs semiconductors.

Another object of the invention is to provide an improved radioactive battery for use at low temperatures.

A still further object of the invention is to utilize a magnetic field for converting the energy of nuclear radiations into electrical energy.

A still further object of the invention is to provide an improved "atomic" battery which is characterized by long life.

Another object of the invention is to utilize the effect of a magnetic field in combination with an electron-voltaic effect for converting the energy of nuclear radiations into useful electrical energy.

The foregoing objects and advantages are achieved in accordance with the invention by disposing a body of semiconducting material in the path of radiations emitted by a nuclear or radioactive emission source. The radiations penetrate the body to generate charge-carriers therein (electrons and holes). The charge-carriers effectively are swept into the interior portion of the semiconducting body by the agency of a diffusion field, and acquire a component of velocity normal to a magnetic field which is applied to the body. The strength of the diffusion field is determined by the diffusion constant for charge-carriers generated in the body, the density of the generated charge-carriers, and other factors which are described hereinafter. The magnetic field separates the electrons and holes so that these charge-carriers flow to produce a potential between non-rectifying connections made to the semiconductive body. The potential thus developed results from what is termed a "magneto electron-voltaic effect" and may be utilized to supply current and power to a load circuit.

In accordance with another feature of the invention, structure is provided in which the "magneto electron-voltaic effect" described above and an "electron-voltaic effect" are combined and utilized for generating electrical energy. The "electron-voltaic effect" is to be distinguished from the "magneto electron-voltaic effect" and, as utilized per se for providing a primary source of electric power, is described in detail in a copending application Serial No. 389,601, filed November 2, 1953, now U.S. Patent No. 2,745,973, granted on May 15, 1956 to Paul Rappaport. In said application a junction type semiconducting device is disclosed and claimed in which p and n-type conductivity regions are formed in a body of semiconducting material. A source of nuclear or radioactive emission irradiates the device producing charge-carriers therein. The charge-carriers flow within the device under the influence of potential barriers in the junction regions and cross these regions to generate an electric potential. In accordance with the present invention, a diffusion field is set up within the junction type device and a magnetic field is applied to the device. By suitably controlling the direction of the magnetic field, the voltage attributable to the "magneto electron-voltaic effect" may be made to add to or subtract from the terminal voltage developed by the electron-voltaic effect.

The invention will be described in greater detail with reference to the accompanying drawing in which:

Figure 1 is a schematic diagram of a radioactive battery, according to the invention, which utilizes the "magneto electron-voltaic effect";

Figure 2 is a schematic diagram of a radioactive battery, according to the invention, which utilizes both the "electron-voltaic effect" and the "magneto electron-voltaic effect" for power generation; and Figure 3 is a schematic diagram of another embodiment of the invention in which the emissions provided by the nuclear emission source of Figure 2 are utilized more efficiently.

Similar reference characters are applied to similar elements throughout the drawing.

Referring to Figure 1, a radioactive battery includes a body of semiconducting material 11, output leads 13 and 15 which are soldered or otherwise connected to said body to make ohmic or non-rectifying contact to opposed surfaces 12 and 14 of the body 11, a nuclear emission source 17 positioned to irradiate the body 11, and means 18 for applying a magnetic field to the semiconducting body whereby the magnetic lines of force are substantially transverse to the direction of travel of emissions produced by the source 17.

The semiconducting body 11 preferably is in the form of a rectangular parallelepiped and comprises a material in which charge-carriers have high mobility and long diffusion lengths. Suitable such semiconducting materials are numerous and include germanium, silicon, cadmium sulfide, and indium antimonide, the latter being an intermetallic compound. The nuclear emission source 17 may comprise one or a combination of radioactive isotopes providing charged particle and/or neutral emission. Such isotopes include, for example, tritium and strontium 90 (emitters of negatively charged beta particles), uranium and polonium (emitters of positively charged alpha particles), and cobalt 60 (a gamma ray emitter). Although any of the above-mentioned isotopes may be utilized in accordance with the invention, a relatively low energy beta particle emitter such as tritium or an alpha particle emitter is preferred for reasons which will be explained more fully below. Also, although not absolutely necessary, it is desirable that the semiconducting body 11 be in physical contact with the emission source 17. In the case of an alpha particle emission source, such contact may be achieved by coating or otherwise applying the emitter to one surface 19 of the body 11. In the case of tritium, a self-ionizing radioactive gas, the gas may be absorbed by a thin zirconium member and that member placed in contact with the surface 19.

A device according to the invention is believed to operate in the following manner. Radioactive emissions produced by the source 17 penetrate the semiconducting body 11 and generate electron-hole pairs in a localized region of the body adjacent the source 17. The fact that electrons and holes are generated only in the localized region adjacent the source 17 results in the production of a strong diffusion field within the body 11. The diffusion field produced is to be distinguished from an electric field and sweeps the generated electrons and holes into the interior of the body 11. Both electrons and holes are swept into the interior of the body in the same direction because initially there is produced a high concentration of electrons and holes in the localized region of the semiconducting body. The aggregate of electrons and the aggregate of holes in this concentration region separately diffuse into the interior of the semiconducting body where there is a low electron concentration and a low hole concentration. The diffusion field E resulting from the difference in concentration or density of charge carriers in the localized region of the semiconducting body and the charge carrier concentration or density in the interior of the semiconducting body has a magnitude equal to $$eD\frac{\partial n}{\partial x}$$

where $e$ is the charge of an electron, $D$ is the diffusion constant of the charge-carriers in the semiconducting body 11, $n$ is the density of charge-carriers generated by the radioactive emission, and $x$ is the direction normal to the surface 19 on which the radioactive emissions impinge. The generated electrons and holes are accelerated by the diffusion field, acquire a component of velocity in the direction normal to the surface 19, and travel into an interior portion of the body 11. The means 18 for applying a magnetic field to the body 11 preferably comprises a permanent magnet and, by way of example, may provide a field strength of the order of 3000 oersteds. The magnet 18 is positioned adjacent the lateral surfaces 21, 23 of the body 11 so that the magnetic lines of force H are transverse to the direction of travel of emissions produced by the radioactive source 17 and separates the electrons and holes. It is believed that the electrons flows toward one ohmic connection 13 and the holes flow toward the remaining ohmic connection 15. The separated electrons and holes effectively are collected at these points and an electric potential is generated which is available between the leads 13 and 15. This potential may be utilized to supply current and power to any desired load circuit, represented generally by the resistor 25.

The terminal voltage developed by the above device and the current which it supplies depends on several factors. These factors include the area of the surface 19 upon which the incident radioactive emissions impinge, the diffusion length of free charge-carriers generated in the body 11, and the strength of the diffusion field gradient. Preferably, the diffusion field gradient is enhanced by sandblasting the rear surface 27 of the body 11 and etching its front surface 19 in a long life etch prior to the applying of the radioactive source 17 to the surface 19. An etching solution which is suitable for germanium or silicon for etching the front surface 19 comprises 15.5 cc. acetic acid, 25 cc. concentrated nitric acid, 15 cc. of 48% hydrofluoric acid, and 0.3 cc. bromine. The etching and sandblasting of the surfaces 19 and 27, respectively, establishes a large difference in surface recombination velocity between these surfaces.

Referring to Figure 2, an embodiment of the invention is shown in which the magneto electron-voltaic effect, utilized in the structure described with reference to Figure 1, is employed in combination with the electron-voltaic effect mentioned previously with reference to the device disclosed in Rappaport Patent No. 2,745,973. In the present embodiment it may be desirable to utilize a radioactive source such as strontium 90 which has greater penetration power than the tritium or alpha emission sources heretofore mentioned. However, the specific source utilized depends upon which of the two above-named effects provides the greater contribution to the total useful power generated and upon the particular semiconducting body material selected.

The structure employed in accordance with this feature of the invention is similar in part to that described with reference to Figure 1. However, in this instance p-type and n-type conductivity regions are formed in the surfaces 12 and 14 of the body 11 to which the output leads 13 and 15 are connected. The p-type junction region may be formed by alloying into surface 12 a material 29 such as indium, boron, gallium, or alloys including these materials. The n-type junction region may be formed in a like manner by alloying into surface 14 a material 31 such as arsenic, antimony, or alloys including these materials. For a detailed description of the alloying technique per se, reference may be made to a copending application Serial No. 294,741, filed June 20, 1952, by Charles W. Mueller, or as described in an article by R. R. Law, C. W. Mueller, J. I. Pankove, and L. D. Armstrong entitled "A Developmental Ge P-N-P Junction Transistor" in the Proceedings of the IRE, vol. 40, page 1352 et seq. for November 1952.

The operation of this device is believed to be as follows. The radiations emitted by the source 17 interact with the valence bonds of the junction device. With the incoming radiation having a minimum quantum energy which is equal to or greater than the energy gap of the empty or forbidden region, charge-carriers (electrons and holes) are liberated within the device. The liberation of these charge-carriers corresponds to raising electrons from the filled band to the conduction band thereby leaving behind holes in the filled band. The energy gaps for germanium and silicon, for example, are of the order of 0.72 electron volts and 1.12 electron volts, respectively.

Electrostatic potential barriers exist between the p-type conductivity region and the semiconducting body and between the n-type conductivity region and the body. The liberated charge-carriers flow under the influence of these potential barriers and cross the junctions. A hole which approaches a p-type junction region sees an electric field of the proper polarity for it to be collected. However, an electron approaching the p-type region is repelled. In a like manner electrons which approach the n-type region are collected and holes are repelled. The diffusion length of the charge-carriers for improved operation should be at least twice the distance between the p and n regions in order that the carriers repelled at a given junction may be collected at the junction having the opposite type conductivity. Since electrons and holes are collected in the manner described above, a voltage is developed between the n-type region and the p-type region which may be utilized to power a load circuit 25. The voltage and current developed in the manner thus far described is attributable to the electron-voltaic effect.

Since the electrons and holes formed in or near the junction regions also are accelerated by a diffusion field existing within the body 11, these carriers acquire a component of velocity in the direction of travel of the entering radiation. The permanent magnet 18 is positioned as described previously so that the holes effectively are deflected and accelerated toward the p-type region and the electrons toward the n-type region. Use of the magnetic field in this manner effectively increases the charge-carrier diffusion length and decreases electron-hole recombination, thereby increasing the terminal voltage and current of the device to a value greater than that which is attainable without the magnetic field. This added contribution to the terminal voltage and current of the device is attributable to the magneto electron-voltaic effect.

In devices employing the electron-voltaic effect it has been found that a further increase in load current is attainable by operating the device at low temperatures. Low temperature operation of the device reduces the junction reverse saturation current which normally tends to reduce the output current of the device. In the event that low temperature operation is desired, the device may be suitably cooled by directing a stream of air onto the device from a jet 30, by placing the device in an enclosure cooled by liquid air or liquid nitrogen, or by other similar means.

In Figure 3 structure is shown in which a single radioactive emission source is used for irradiating two semiconducting devices, each device being of the type described with reference to Figure 2. The radioactive emitter 17 preferably is contained in an insulating holder 33 such as polystyrene. The walls of the holder adjacent the two semiconducting devices are made sufficiently thin that the radiations easily penetrate these walls and create electrons and holes in each device. The remaining walls of the holder 33 are made relatively thick so that substantially no radiation escapes from the overall unit which would constitute a health hazard. Since the useful radioactive emissions incident on one device travel in a direction which is opposite to the direction of travel of emissions incident on the other device, the two devices are arranged so that the p-type region of one device is adjacent the n-type region of the other device. A single magnet may then be used to enhance the collection of charge-carriers in both devices. If the devices were not so arranged, the magneto electron-voltaic effect would enhance the voltage developed by one device and reduce the voltage developed by the other device.

The two devices thus are powered by a single radioactive source and utilize its emissions more efficiently than do the other embodiments heretofore described. The two devices may be connected either in series or in parallel depending upon whether a high voltage output or a high current output is desired. In the present example a series connection is shown which conveniently may be made by means of a lead 35 connecting the n-type region of one device to the p-type region of the remaining device.

What is claimed is:

1. A primary source of electrical energy comprising, a body of semiconducting material, a source of nuclear emissions positioned adjacent to said body to irradiate at least a portion of said body to produce electrons and holes in a localized region of said body which diffuse into said body, means adjacent to said body for applying a magnetic field to said body, the magnetic lines of force of said field within said portion of said body being substantially transverse to the direction of travel of said emissions within said portion of said body to cause separation of said electrons and holes, and non-rectifying contacts secured to said body for separately collecting said electrons and holes and thereby deriving an electric current.

2. A primary energy source as claimed in claim 1 wherein said nuclear emission source comprises a source providing alpha particle emissions.

3. A primary energy source as claimed in claim 1 wherein said nuclear emission source comprises a source providing beta particle emissions.

4. A primary energy source as claimed in claim 3 wherein said source providing beta particle emissions is tritium.

5. A primary energy source as claimed in claim 1 including a permanent magnet for providing said magnetic field.

6. A primary energy source as claimed in claim 1 wherein said semiconducting body material is germanium.

7. A primary energy source as claimed in claim 1 wherein said semiconducting body material is silicon.

8. A primary energy source as claimed in claim 1 wherein said semiconducting body material is an intermetallic compound.

9. A primary energy source as claimed in claim 1 wherein said nuclear emission source is in contact with said semiconducting body.

10. A primary energy source as claimed in claim 1 including load means connected to said contacts.

11. A primary source of electrical energy comprising, a rectangular parallelepiped of semiconducting material, a source of nuclear emissions positioned adjacent to said material to irradiate at least a portion of said material including one surface thereof to produce electrons and holes in a localized region adjacent said surface which diffuse into said body, means adjacent to said material for applying a magnetic field to said material, the magnetic lines of force of said field within said portion of said material being substantially transverse to the direction of travel of said emissions within said portion of said body to cause separation of said electrons and holes, and a pair of non-rectifying contacts for separately collecting said electrons and holes, said contacts being connected to opposed surfaces of said material adjacent said one surface and said opposed surfaces being parallel to said magnetic lines of force.

12. A primary source of electrical energy comprising, a body of semiconducting material, a p-type conductivity region formed at one surface of said body, an n-type conductivity region formed at an opposing surface of said body, a source of nuclear emissions positioned adjacent to said body to irradiate at least a portion of said body including a surface thereof adjacent said opposed surfaces to produce electrons and holes in a localized region of said body which diffuse into said body, means adjacent to said body for applying a magnetic field to said body, the magnetic lines of force of said field within said body being substantially transverse to the direction of travel of said emissions within said body to cause separation of said electrons and holes, and connection means to said p-type and n-type regions for separately collecting said electrons and holes and thereby deriving an electric current.

13. A primary energy source as claimed in claim 12 wherein the distance between said p-type region and said n-type region is less than one-half the diffusion length of charge-carriers produced in said body as a result of said irradiation.

14. A primary energy source as claimed in claim 12 wherein said source of nuclear emissions is in physical contact with said adjacent surface.

15. A primary energy source as claimed in claim 12 including load means connected to said connection means.

16. A primary energy source as claimed in claim 12 including means for cooling said semiconducting body for low temperature operation.

17. A primary source of electrical energy comprising, a plurality of devices each including a body of semiconducting material, a p-type conductivity region formed at one surface of each body and an n-type conductivity region formed at an opposing surface of each body, a source of nuclear emissions positioned adjacent said bodies to irradiate at least a portion of each of said bodies including a surface thereof adjacent said opposed surfaces to produce electrons and holes in a localized region of said body which diffuse into said body, means adjacent to said bodies for applying a magnetic field to each body, the magnetic lines of force of said field within said bodies being substantially transverse to the direction of travel of said emissions within said body to cause separation of said electrons and holes, and connection means to the p-type and n-type regions of each of said devices for separately collecting said electrons and holes and thereby deriving an electric current.

18. A primary energy source as claimed in claim 17 wherein said connection means connect said devices in series.

19. A primary energy source as claimed in claim 17 wherein said plurality of devices comprise two devices, and said nuclear emission source is positioned between said two devices.

20. A primary energy source as claimed in claim 19 wherein said nuclear emission source is contained within a holder in physical contact with said two devices said holder being formed of an electrical insulating material which is transparent to said nuclear emissions.

References Cited in the file of this patent

UNITED STATES PATENTS

| | | |
|---|---|---|
| 2,517,120 | Linder | Aug. 1, 1950 |
| 2,597,028 | Pfann | May 20, 1952 |
| 2,661,431 | Linder | Dec. 1, 1953 |
| 2,695,930 | Wallace | Nov. 30, 1954 |
| 2,719,253 | Willardson et al. | Sept. 27, 1955 |
| 2,745,973 | Rappaport | May 15, 1956 |
| 2,778,802 | Willardson et al. | Jan. 22, 1957 |

OTHER REFERENCES

"Holes and Electrons," by William Shockley, published in Physics Today, vol. 3, October 1950, pp. 16–24, and collected in the publication "The Transistor," prepared by Bell Telephone Lab. Inc. for Western Electric Co. Inc., New York City, New York.

"Sourcebook on Atomic Energy," by Samuel Glasstone, D. Van Nostrand Co., Inc., New York, copyright 1950, p. 329.